United States Patent
Boman et al.

(10) Patent No.: US 7,564,350 B2
(45) Date of Patent: *Jul. 21, 2009

(54) METHOD AND SYSTEM FOR MONITORING CONTAINERS TO MAINTAIN THE SECURITY THEREOF

(75) Inventors: Hans Boman, Stockholm (SE); Eric Sandberg, Knivsta (SE); Stig Ekström, Järfälla (SE); Magnus Cederlöf, Sollentuna (SE)

(73) Assignee: All Set Marine Security AB, Bromma (SE)

( * ) Notice: Subject to any disclaimer, the term of this patent is extended or adjusted under 35 U.S.C. 154(b) by 433 days.

This patent is subject to a terminal disclaimer.

(21) Appl. No.: 11/198,738

(22) Filed: Aug. 5, 2005

(65) Prior Publication Data
US 2007/0005953 A1    Jan. 4, 2007

Related U.S. Application Data

(63) Continuation of application No. 10/667,282, filed on Sep. 17, 2003.

(60) Provisional application No. 60/470,435, filed on May 15, 2003, provisional application No. 60/411,042, filed on Sep. 17, 2002.

(51) Int. Cl.
*G08B 13/08* (2006.01)

(52) U.S. Cl. ............... 340/545.6; 340/438; 340/431; 340/539.13; 340/541

(58) Field of Classification Search ... 340/572.1–572.9, 340/545.1, 539.26, 521, 989, 431, 438, 10.1–10.6, 340/539.13
See application file for complete search history.

(56) References Cited

U.S. PATENT DOCUMENTS

| | | | |
|---|---|---|---|
| 4,438,428 A | * | 3/1984 | Ober et al. ............... 340/521 |
| 4,688,244 A | | 8/1987 | Hannon et al. |
| 4,750,197 A | | 6/1988 | Denekamp et al. |
| 4,808,974 A | * | 2/1989 | Cantley .................. 340/546 |
| 4,849,927 A | | 7/1989 | Vos |
| 4,897,642 A | | 1/1990 | DiLullo et al. |
| 5,072,212 A | * | 12/1991 | Sorenson ................ 340/546 |
| 5,097,253 A | | 3/1992 | Eschbach et al. |

(Continued)

FOREIGN PATENT DOCUMENTS

BE     1012912     5/2001

(Continued)

OTHER PUBLICATIONS

Dallas Semiconductor Maxim, "iButton Overview", XP-002340628, Aug. 10, 2003, (3 pgs.).

(Continued)

*Primary Examiner*—George A Bugg
*Assistant Examiner*—Hoi C Lau
(74) *Attorney, Agent, or Firm*—Global Patent Operation

(57) ABSTRACT

A container and contents monitoring system includes a device, a reader, a server, and a software backbone. The device communicates with the reader in order to determine the security and/or location of the container to which the device is attached. The reader transmits the information from the device to the server. The device determines if a security condition has occurred based on at least one sensor located on or in the container.

7 Claims, 15 Drawing Sheets

U.S. PATENT DOCUMENTS

| | | | |
|---|---|---|---|
| 5,189,396 A | | 2/1993 | Stobbe |
| 5,341,123 A | * | 8/1994 | Schuman et al. ............. 340/546 |
| 5,347,274 A | | 9/1994 | Hassett |
| 5,355,511 A | | 10/1994 | Hatano et al. |
| 5,448,220 A | | 9/1995 | Levy |
| 5,475,597 A | | 12/1995 | Buck |
| 5,499,014 A | * | 3/1996 | Greenwaldt ............ 340/539.11 |
| 5,565,858 A | | 10/1996 | Guthrie |
| 5,577,696 A | * | 11/1996 | Kramer ................... 248/206.5 |
| 5,602,526 A | | 2/1997 | Read |
| 5,686,888 A | | 11/1997 | Welles, II et al. |
| 5,712,789 A | | 1/1998 | Radican |
| 5,828,322 A | | 10/1998 | Eberhard |
| 5,831,519 A | * | 11/1998 | Pedersen et al. ......... 340/425.5 |
| 5,832,090 A | * | 11/1998 | Raspotnik .................... 705/66 |
| 5,917,433 A | * | 6/1999 | Keillor et al. ............... 340/989 |
| 5,939,982 A | * | 8/1999 | Gagnon et al. ......... 340/539.17 |
| 5,959,568 A | | 9/1999 | Woolley |
| 5,999,091 A | * | 12/1999 | Wortham ................... 340/431 |
| 6,069,563 A | | 5/2000 | Kadner et al. |
| 6,133,842 A | | 10/2000 | Gariepy |
| 6,211,907 B1 | | 4/2001 | Scaman et al. |
| 6,266,008 B1 | | 7/2001 | Huston et al. |
| 6,381,977 B1 | * | 5/2002 | Austin, Jr. .................. 62/259.1 |
| 6,400,266 B1 | * | 6/2002 | Brown, Jr. .................. 340/542 |
| 6,437,702 B1 | | 8/2002 | Ragland et al. |
| 6,483,433 B2 | * | 11/2002 | Moskowitz et al. ...... 340/568.1 |
| 6,483,434 B1 | | 11/2002 | UmiKer |
| 6,556,149 B1 | * | 4/2003 | Reimer et al. .................. 341/20 |
| 6,577,921 B1 | | 6/2003 | Carson |
| 6,665,585 B2 | | 12/2003 | Kawase |
| 6,687,609 B2 | | 2/2004 | Hsiao et al. |
| 6,724,303 B2 | | 4/2004 | McGunn et al. |
| 6,737,962 B2 | * | 5/2004 | Mayor ....................... 340/431 |
| 6,745,027 B2 | | 6/2004 | Twitchell, Jr. |
| 6,747,558 B1 | * | 6/2004 | Thorne et al. ............... 340/551 |
| 6,753,775 B2 | | 6/2004 | Auerbach et al. |
| 6,788,203 B1 | | 9/2004 | Roxbury et al. |
| 6,963,270 B1 | * | 11/2005 | Gallagher et al. .......... 340/10.2 |
| 7,019,640 B2 | | 3/2006 | Canich et al. |
| 7,081,816 B2 | | 7/2006 | Schebel et al. |
| 7,098,784 B2 | * | 8/2006 | Easley et al. ........... 340/539.13 |
| 7,154,394 B2 | * | 12/2006 | Zhou ....................... 340/568.8 |
| 7,315,246 B2 | * | 1/2008 | Rajapakse et al. ........... 340/549 |
| 7,317,387 B1 | * | 1/2008 | Cova et al. ............... 340/539.1 |
| 2001/0030599 A1 | | 10/2001 | Zimmerman et al. |
| 2002/0061758 A1 | * | 5/2002 | Zarlengo et al. ............ 455/517 |
| 2003/0233189 A1 | * | 12/2003 | Hsiao et al. .................. 701/207 |
| 2004/0041705 A1 | | 3/2004 | Auerbach et al. |
| 2004/0041708 A1 | * | 3/2004 | Greenwaldt ................. 340/571 |
| 2004/0066328 A1 | | 4/2004 | Galley et al. |
| 2004/0073808 A1 | | 4/2004 | Smith et al. |
| 2004/0100379 A1 | | 5/2004 | Boman et al. |
| 2004/0113783 A1 | | 6/2004 | Yagesh |
| 2004/0119588 A1 | * | 6/2004 | Marks ..................... 340/539.1 |
| 2004/0189466 A1 | | 9/2004 | Morales |
| 2004/0196152 A1 | | 10/2004 | Tice |
| 2004/0215532 A1 | | 10/2004 | Boman et al. |
| 2004/0227630 A1 | | 11/2004 | Shannon et al. |
| 2004/0233041 A1 | | 11/2004 | Bohman et al. |
| 2005/0046567 A1 | | 3/2005 | Mortenson et al. |
| 2005/0073406 A1 | | 4/2005 | Easley et al. |
| 2005/0110635 A1 | | 5/2005 | Giermanski et al. |
| 2005/0134457 A1 | | 6/2005 | Rajapakse et al. |
| 2005/0151643 A1 | * | 7/2005 | Rajapakse et al. ........ 340/545.2 |
| 2005/0154527 A1 | | 7/2005 | Ulrich |
| 2005/0179545 A1 | | 8/2005 | Bergman et al. |
| 2007/0008107 A1 | * | 1/2007 | Farrell et al. ............. 340/539.1 |

FOREIGN PATENT DOCUMENTS

| | | | |
|---|---|---|---|
| DE | 195 04 733 A1 | | 8/1996 |
| DE | 195 34 948 | | 3/1997 |
| DE | 197 04 210 | | 8/1998 |
| EP | 0 649 957 A2 | | 4/1995 |
| EP | 0 704 712 A1 | | 4/1996 |
| EP | 0 748 083 A1 | | 12/1996 |
| EP | 1063627 | | 12/2000 |
| EP | 1 182 154 | | 2/2002 |
| EP | 1 246 094 | | 10/2002 |
| GB | 1 055 457 | | 1/1967 |
| GB | 2 254 506 A | | 10/1992 |
| JP | 60261754 A | * | 12/1985 |
| JP | 11246048 | | 9/1999 |
| JP | 2001261159 | | 9/2001 |
| JP | 2002039659 | | 2/2002 |
| RU | 2177647 | | 12/2001 |
| WO | WO 99/33040 | | 7/1999 |
| WO | WO 99/38136 | | 7/1999 |
| WO | WO 00/70579 | | 11/2000 |
| WO | WO 01/33247 A1 | | 5/2001 |
| WO | WO 02/25038 A2 | | 3/2002 |
| WO | WO 02/077882 | | 10/2002 |
| WO | WO-02/089084 | | 11/2002 |
| WO | WO 03/023439 | | 3/2003 |
| WO | WO-2004/009473 | | 1/2004 |
| WO | WO-2004/066236 | | 8/2004 |
| WO | WO-2005/008609 | | 1/2005 |

OTHER PUBLICATIONS

Jenn Hann Technology Co., Ltd.; Polices and People On-line Computer System; Magnetic Spring Projector. (with English translation).

Bluetooth-The Universal Radio Interface for Ad Hoc, Wireless Connectivity; Jaap Haartsen, 40 pages.

"A Software System for Locating Mobile Users: Design, Evaluation, and Lessons"; Bahl et al.; No Date pp. 1-13.

"Radar: An In-Building RF-based User Location and Tracking System"; Bahl et al.; No Date 10 pages.

* cited by examiner

METHOD AND SYSTEM FOR MONITORING CONTAINERS TO MAINTAIN THE SECURITY THEREOF

CROSS-REFERENCES TO RELATED APPLICATIONS

This Application for Patent is a Continuation of U.S. patent application Ser. No. 10/667,282, filed on Sep. 17, 2003. U.S. patent application Ser. No. 10/667,282 claims priority from, and hereby incorporates by reference for any purpose the entire disclosure of, co-pending Provisional Patent Application No. 60/470,435 filed on May 15, 2003, and co-pending Provisional Patent Application No. 60/411,042 filed on Sep. 17, 2002. This Application for Patent incorporates by reference the entire disclosure of each of the above-listed patent applications.

BACKGROUND

1. Technical Field

The present invention relates to a method of and system for monitoring the security of a container and tracking its location and, more particularly, but not by way of limitation, to a method of and system for monitoring the security of and tracking intermodal freight containers throughout a supply chain to discourage or prevent such urgent problems as terrorism, and also illegal immigration, theft or adulteration of goods, and other irregularities.

2. History of the Related Art

The vast majority of goods shipped throughout the world are shipped via what are referred to as intermodal freight containers. As used herein, the term "containers" includes any container (whether with wheels attached or not) that is not transparent to radio frequency signals, including, but not limited to, intermodal freight containers. The most common intermodal freight containers are known as International Standards Organization (ISO) dry intermodal containers, meaning they meet certain specific dimensional, mechanical and other standards issued by the ISO to facilitate global trade by encouraging development and use of compatible standardized containers, handling equipment, ocean-going vessels, railroad equipment and over-the-road equipment throughout the world for all modes of surface transportation of goods. There are currently more than 12 million such containers in active circulation around the world as well as many more specialized containers such as refrigerated containers that carry perishable commodities. The United States alone receives approximately six million loaded containers per year, or approximately 17,000 per day, representing nearly half of the total value of all goods received each year.

Since approximately 90% of all goods shipped internationally are moved in containers, container transport has become the backbone of the world economy.

The sheer volume of containers transported worldwide renders individual physical inspection impracticable, and only approximately 2% to 3% of containers entering the United States are actually physically inspected. Risk of introduction of a terrorist biological, radiological or explosive device via a freight container is high, and the consequences to the international economy of such an event could be catastrophic, given the importance of containers in world commerce.

Even if sufficient resources were devoted in an effort to conduct physical inspections of all containers, such an undertaking would result in serious economic consequences. The time delay alone could, for example, cause the shut down of factories and undesirable and expensive delays in shipments of goods to customers.

Current container designs fail to provide adequate mechanisms for establishing and monitoring the security of the containers or their contents. A typical container includes one or more door hasp mechanisms that allow for the insertion of a plastic or metal indicative "seal" or bolt barrier conventional "seal" to secure the doors of the container. The door hasp mechanisms that are conventionally used are very easy to defeat, for example, by drilling an attachment bolt of the hasp out of a door to which the hasp is attached. The conventional seals themselves currently in use are also quite simple to defeat by use of a common cutting tool and replacement with a rather easily duplicated seal.

A more advanced solution proposed in recent time is an electronic seal ("e-seal"). These e-seals are equivalent to traditional door seals and are applied to the containers via the same, albeit weak, door hasp mechanism as an accessory to the container, but include an electronic device such as a radio or radio reflective device that can transmit the e-seal's serial number and a signal if the e-seal is cut or broken after it is installed. However, the e-seal is not able to communicate with the interior or contents of the container and does not transmit information related to the interior or contents of the container to another device.

The e-seals typically employ either low power radio transceivers or use radio frequency backscatter techniques to convey information from an e-seal tag to a reader installed at, for example, a terminal gate. Radio frequency backscatter involves use of a relatively expensive, narrow band high-power radio technology based on combined radar and radio-broadcast technology. Radio backscatter technologies require that a reader send a radio signal with relatively high transmitter power (i.e., 0.5-3 W) that is reflected or scattered back to the reader with modulated or encoded data from the e-seal.

In addition, e-seal applications currently use completely open, unencrypted and insecure air interfaces and protocols allowing for relatively easy hacking and counterfeiting of e-seals. Current e-seals also operate only on locally authorized frequency bands below 1 GHz, rendering them impractical to implement in global commerce involving intermodal containers since national radio regulations around the world currently do not allow their use in many countries.

Furthermore, the e-seals are not effective at monitoring security of the containers from the standpoint of alternative forms of intrusion or concern about the contents of a container, since a container may be breached or pose a hazard in a variety of ways since the only conventional means of accessing the inside of the container is through the doors of the container. For example, a biological agent could be implanted in the container through the container's standard air vents, or the side walls of the container could be cut through to provide access. Although conventional seals and the e-seals afford one form of security monitoring the door of the container, both are susceptible to damage. The conventional seal and e-seals typically merely hang on the door hasp of the container, where they are exposed to physical damage during container handling such as ship loading and unloading. Moreover, conventional seals and e-seals cannot monitor the contents of the container and are not able to interface with or (since containers are manufactured from steel that is opaque to radio signals) transmit data to the outside world from other sensors which may be placed in the interior of the container such as, for example, temperature, light, combustible gas, motion, or radioactivity sensors (without modifying the container door or wall).

In addition to the above, the monitoring of the integrity of containers via door movement can be relatively complex. Although the containers are constructed to be structurally sound and carry heavy loads, both within the individual containers as well as by virtue of containers stacked upon one another, each container is also designed to accommodate transverse loading to accommodate dynamic stresses and movement inherent in (especially) ocean transportation and which are typically encountered during shipment of the container. Current ISO standards for a typical container may allow movement on a vertical axis due to transversal loads by as much as 40 millimeters relative to one another. Therefore, security approaches based upon maintaining a tight interrelationship between the physical interface between two container doors are generally not practicable.

It would therefore be advantageous to provide a method of and system for: (i) monitoring the movement of the doors of a container relative to the container structure in a cost effective, always available, yet reliable fashion; (ii) providing for a data path for other security sensors placed in a container to detect alternative means of intrusion or presence of dangerous or illicit cargo to receivers in the outside world; and (iii) simultaneously provide a means for tracking transport movements of containers for reasons of security and logistics efficiency.

SUMMARY OF THE INVENTION

These and other drawbacks are overcome by embodiments of the present invention, which provides a method of and system for efficiently and reliably monitoring a container and its contents as well as tracking containers to maintain the security thereof. More particularly, one aspect of the invention includes a device for monitoring the condition of a container. The device includes a means for sensing at least one condition of the container, a means for transmitting information relative to the at least one sensed condition to a location outside the container, and a means for interpreting the at least one sensed condition. The means for interpreting is adapted to be disposed inside the container. The sensed condition may be a sensed pressure and the means for sensing may be a pressure sensor. Alternatively, the sensed condition may be a sensed light or a sensed motion and the means for sensing may be a light sensor or a motion sensor respectively.

In another aspect, the present invention relates to a method of electronically securing a container. The method includes the steps of selecting a container to seal, disposing an electronic securing device within the container, transmitting a request to a server, and generating by the server of a mathematically-unique security key in response to receipt of the request. The method also includes the steps of encrypting, by the server, of the security key, transmitting the unique and encrypted security key to the device disposed within the container, use by the device of the encrypted security key to calculate a unique result, and storing, by the device, of the unique result.

In another aspect, the present invention relates to a device for determining whether a security breach of a container has occurred. The device includes means for detecting pressure exerted by a door of the container and means for establishing a baseline pressure value. The baseline pressure value is related to a calculated mean value from at least two pressure detections. The device also includes a means for defining a pressure threshold and a means for determining from the pressure threshold and the detected pressure whether a security breach has occurred.

In another aspect, the present invention relates to a method of detecting a security breach of a container. The method includes the steps of placing a pressure sensor adjacent a structural member and a door of the container, monitoring the pressure sensor via a data unit located within the container, determining, by the data unit, whether a security breach of the door has occurred based on a change in pressure sensed by the pressure sensor, communicating, by the data unit, of a result of the determining step to an antenna interoperably connected to the data unit and located adjacent to and outside of the container, and transmitting, by the antenna, of information relative to the communicating step.

In another aspect, the present invention relates to a method of checking a security status of a previously electronically secured container of the type wherein a security device is disposed therein. The method includes the steps of transmitting, by a reader, of a device challenge to a device associated with the container, generating, by the device, of a device response to the device challenge, and transmitting, by the device, of the device response to the reader. The method also includes the steps of transmitting, by the reader, of a server challenge to a server, generating, by the server, of a server response to the server challenge, and transmitting, by the server, of the server response to the reader. The method also includes the steps of comparing the server response and the device response. If the server response and the device response are equal, a security breach is deemed to not have occurred since the container was electronically sealed.

In another aspect, the present invention relates to a device for determining whether a security breach of a container has occurred. The device includes a means for sensing at least one condition of the container, means for establishing a baseline value for the sensed condition, means for defining a sensed condition value threshold, and means for determining from the sensed condition value threshold and the sensed condition whether a security breach has occurred.

In another aspect, the present invention relates to a device for determining a security condition of a container and its contents. The device includes a means for detecting a condition of the container and its contents and a means for establishing a baseline condition value. The baseline condition value is related to normal fluctuations in the condition of the container and its contents experienced during transport. The device also includes a means for defining a condition threshold and a means for determining from the condition threshold and the detected condition, the security condition of the container.

In another aspect, the present invention relates to a method of detecting a security condition in a container and its contents. The method includes the steps of placing a sensor within the container, monitoring the sensor via a data unit located within the container, and determining by the data unit whether a security condition has occurred based on sensed changes in value sensed by the sensor. The method also includes the steps of communicating by the data unit, of a result of the determining step to an antenna interoperably connected to the data unit and located relative to the container in a position for transmitting data to a location outside the container, and transmitting by the antenna of information relative to the communication step.

BRIEF DESCRIPTION OF DRAWINGS

A more complete understanding of exemplary embodiments of the present invention can be achieved by reference to the following Detailed Description of Exemplary Embodiments of the Invention when taken in conjunction with the accompanying Drawings, wherein.

DETAILED DESCRIPTION OF EXEMPLARY EMBODIMENTS OF THE PRESENT INVENTION

It has been found that a container security device of the type set forth, shown, and described below, may be positioned in and secured to a container for effective monitoring of the integrity and condition thereof and its contents. As will be defined in more detail below, a device in accordance with principles of the present invention is constructed for positioning within a pre-defined structural portion of the container which generally manifests minimal structural movement due to routine loading and handling and extending through a conventional interface between the container frame and door region therealong. An elastomeric gasket is conventionally placed around the door and extends through the interface region to ensure the container is watertight and the goods thus protected from weather. The device is adapted for: (a) easy tool-free installation; (b) self powered intermittent signal transmission; and (c) sensing of the pressure of the elastomeric door seal relative thereto for transmitting deviations thereof indicative of door movements of the container, including an intrusion therein.

Figure 1A:
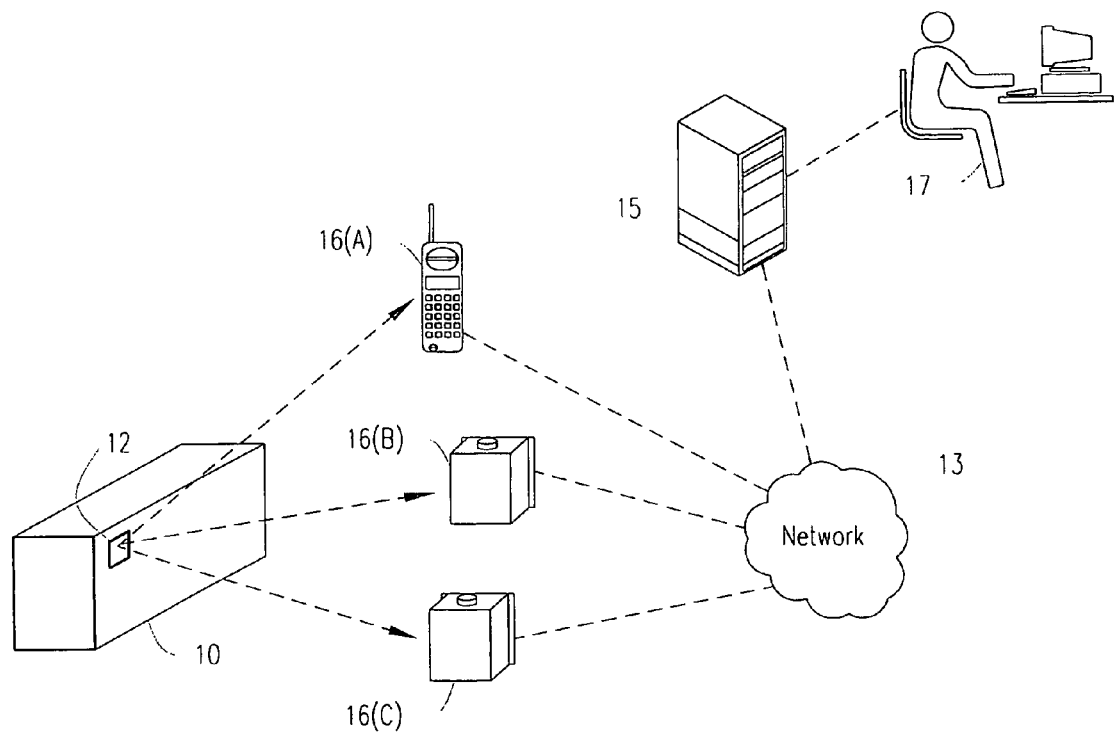
FIG. 1A is a diagram illustrating communication among components of a system according to an embodiment of the present invention.

FIG. 1A is a diagram illustrating communication among components of a system in accordance with principles of the present invention. The system includes a device 12, at least one variety of reader 16, a server 15, and a software backbone 17. The device 12 ensures that the container has not been breached after the container 10 has been secured. The container 10 is secured and tracked by a reader 16. Each reader 16 may include hardware or software for communicating with the server 15 such as a modem for transmitting data over GSM, CDMA, etc. or a cable for downloading data to a PC that transmits the data over the Internet to the server 15. Various conventional means for transmitting the data from the reader 16 to the server 15 may be implemented within the reader 16 or as a separate device. The reader 16 may be configured as a handheld reader 16(A), a mobile reader 16(B), or a fixed reader 16(C). The handheld reader 16(A) may be, for example, operated in conjunction with, for example, a mobile phone, a personal digital assistant, or a laptop computer. The mobile reader 16(B) is basically a fixed reader with a GPS interface, typically utilized in mobile installations (e.g., on trucks, trains, or ships using existing GPS, AIS or similar positioning systems) to secure, track, and determine the integrity of the container in a manner similar to that of the handheld reader 16(A). In fixed installations, such as, for example, those of a port or shipping yard, the fixed reader 16(C) is typically installed on a crane or gate. The reader 16 serves primarily as a relay station between the device 12 and the server 15.

The server 15 stores a record of security transaction details such as, for example, door events (e.g., security breaches, container security checks, securing the container, and disarming the container), location, as well as any additional desired peripheral sensor information (e.g., temperature, motion, radioactivity). The server 15, in conjunction with the software backbone 17, may be accessible to authorized parties in order to determine a last known location of the container 10, make integrity inquiries for any number of containers, or perform other administrative activities.

The device 12 communicates with the readers 16 via a short-range radio interface such as, for example, a radio interface utilizing direct-sequence spread-spectrum principles. The radio interface may use, for example, BLUETOOTH or any other short-range, low-power radio system that operates in the license-free Industrial, Scientific, and Medical (ISM) band, which operates around e.g. 2.4 GHz. Depending on the needs of a specific solution, related radio ranges are provided, such as, for example, a radio range of up to 100 m.

The readers 16 may communicate via a network 13, e.g. using TCP/IP, with the server 15 via any suitable technology such as, for example, Universal Mobile Telecommunications System (UMTS), Global System for Mobile Communications (GSM), Code Division Multiple Access (CDMA), Time Division Multiple Access (TDMA), Pacific Digital Cellular System(PDC), Wideband Local Area Network (WLAN), Local Area Network (LAN), Satellite Communications systems, Automatic Identification Systems (AIS), or Mobitex. The server 15 may communicate with the software backbone 17 via any suitable wired or wireless technology. The software backbone 17 is adapted to support real-time surveillance services such as, for example, tracking and securing of the container 10 via the server 15, the readers 16, and the device 12. The server 15 and/or the software backbone 17 are adapted to store information such as, for example, identification information, tracking information, door events, and other data transmitted by the device 12 and by any additional peripheral sensors interoperably connected to the device 12. The software backbone 17 also allows access for authorized parties to the stored information via a user interface that may be accessed via, for example, the Internet.

Figure 1B:
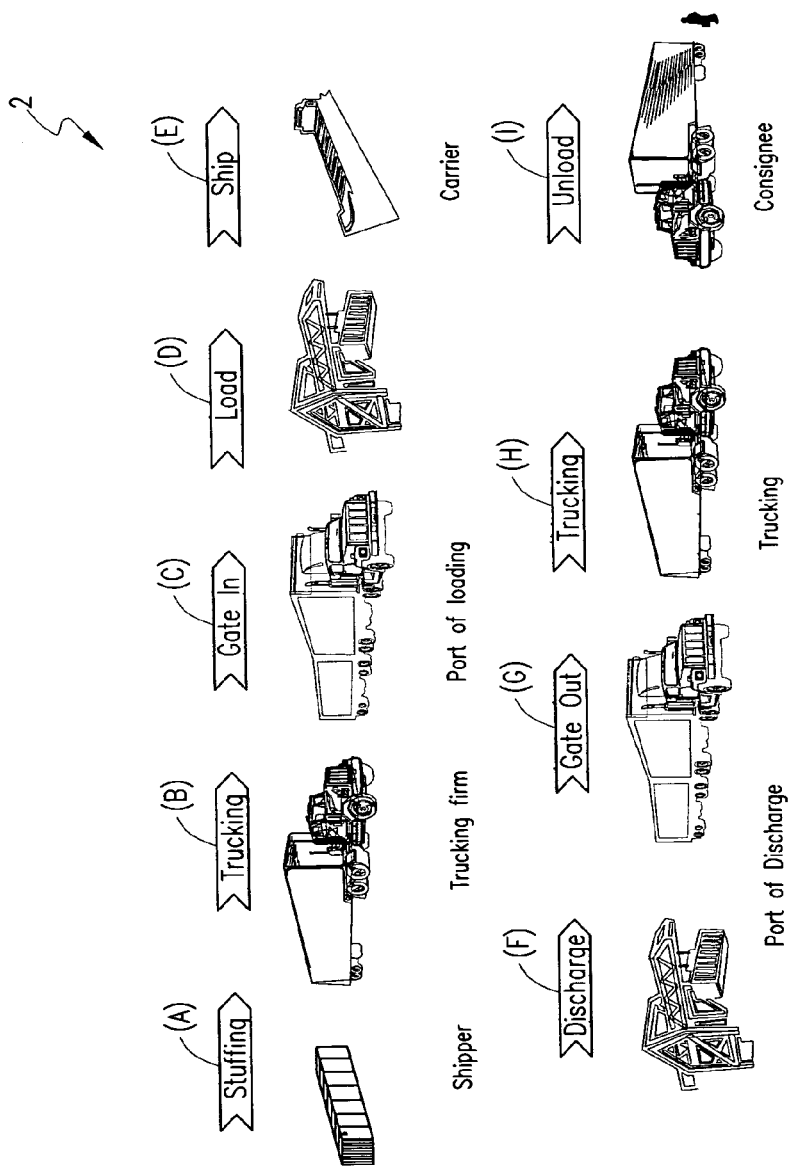
FIG. 1B is a diagram illustrating an exemplary supply chain.

Referring now to FIG. 1B, there is shown a diagram illustrating a flow 2 of an exemplary supply chain from points (A) to (I). Referring first to point (A), a container 10 is filled with cargo by a shipper or the like. At point (B), the loaded container is shipped to a port of embarkation via highway or rail transportation. At point (C), the container is gated in at the port of loading such as a marine shipping yard.

At point (D), the container is loaded on a ship operated by a carrier. At point (E), the container is shipped by the carrier to a port of discharge. At point (F), the container is discharged from the ship. Following discharge at point (F), the container is loaded onto a truck and gated out of the port of discharge at point (G). At point (H), the container is shipped via land to a desired location in a similar fashion to point (B). At point (I), upon arrival at the desired location, the container is unloaded by a consignee.

As will be apparent to those having ordinary skill in the art, there are many times within the points of the flow 2 at which security of the container could be compromised without visual or other conventional detection. In addition, the condition of the contents of the container could be completely unknown to any of the parties involved in the flow 2 until point (H) when the contents of the container are unloaded.

Figure 2A:
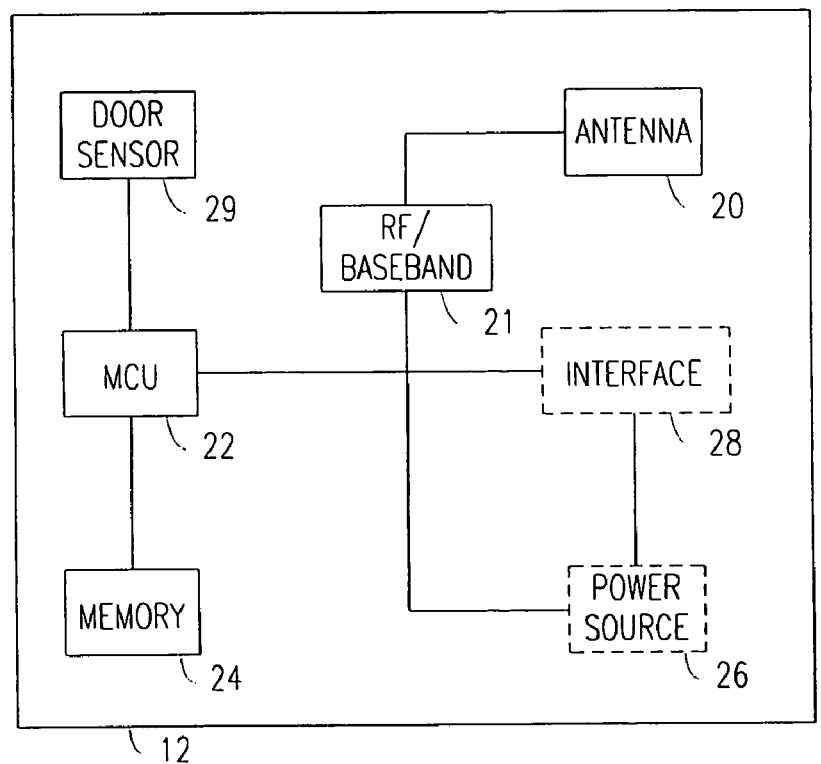
FIG. 2A is a schematic diagram of a device according to an embodiment of the present invention.

FIG. 2A is a block diagram of the device 12. The device 12 includes an antenna 20, an RF/baseband unit 21, a microprocessor (MCU) 22, a memory 24, and a door sensor 29. The device 12 may also include an interface 28 for attachment of additional sensors to monitor various internal conditions of the container such as, for example, temperature, vibration, radioactivity, gas detection, and motion. The device 12 may also include an optional power source 26 (e.g., battery); however, other power arrangements that are detachable or remotely located may also be utilized by the device 12. When the power source 26 includes a battery (as shown herein), inclusion of the power source 26 in the device 12 may help to prolong battery life by subjecting the power source 26 to smaller temperature fluctuations by virtue of the power source 26 being inside the container 10. The presence of the power source 26 within the container 10 is advantageous in that the ability to tamper with or damage the power source 26 is decreased. The device 12 may also optionally include a connector for interfacing directly with the reader 16. For example, a connector may be located on an outer wall of the container 10 for access by the reader 16. The reader 16 may then connect via a cable or other direct interface to download information from the device 12.

The microprocessor 22 (equipped with an internal memory) discerns door events from the door sensor 29, including, for example, container-security requests, container-disarming requests, and container-security checks. The discerned door events also include security breaches that may compromise the contents of the container 10, such as opening of a door after the container 10 has been secured. The door events may be time-stamped and stored in the memory 24 for transmission to the reader 16. The door events may be transmitted immediately, periodically, or in response to an interrogation from the reader 16. The door sensor 29 shown herein is of the pressure sensitive variety, although it may be, for example, an alternative contact sensor, a proximity sensor, or any other suitable type of sensor detecting relative movement between two surfaces. The term pressure sensor as used herein thus includes, but is not limited to, these other sensor varieties.

The antenna 20 is provided for data exchange with the reader 16. In particular, various information, such as, for example, status and control data, may be exchanged. The microprocessor 22 may be programmed with a code that uniquely identifies the container 10. The code may be, for example, an International Standards Organization (ISO) container identification code. The microprocessor 22 may also store other logistic data, such as Bill-of-Lading (B/L), a mechanical seal number, a reader identification with a timestamp, etc. A special log file may be generated, so that tracking history together with door events may be recovered. The code may also be transmitted from the device 12 to the reader 16 for identification purposes. The RF/baseband unit 21 upconverts microprocessor signals from baseband to RF for transmission to the reader 16.

The device 12 may, via the antenna 20, receive an integrity inquiry from the reader 16. In response to the integrity query, the microprocessor 22 may then access the memory to extract, for example, door events, temperature readings, security breaches, or other stored information in order to forward the extracted information to the reader 16. The reader 16 may also send a security or disarming request to the device 12. When the container 10 is secured by the reader 16, the MCU 22 of the device 12 may be programmed to emit an audible or visual alarm when the door sensor 29 detects a material change in pressure after the container is secured. The device 12 may also log the breach of security in the memory 24 for transmission to the reader 16. If the reader 16 sends a disarming request to the device 12, the microprocessor 22 may be programmed to disengage from logging door events or receiving signals from the door sensor 29 or other sensors interoperably connected to the device 12.

The microprocessor 22 may also be programmed to implement power-management techniques for the power source 26 to avoid any unnecessary power consumption. In particular, one option is that one or more time window(s) are specified via the antenna 20 for activation of the components in the device 12 to exchange data. Outside the specified time windows, the device 12 may be set into a sleep mode to avoid unnecessary power losses. Such a sleep mode may account for a significant part of the device operation time, the device 12 may as a result be operated over several years without a need for battery replacement.

In particular, according to the present invention, the device 12 utilizes a "sleep" mode to achieve economic usage of the power source 26. In the sleep mode, a portion of the circuitry of the device 12 is switched off For example, all circuitry may be switched off except for the door sensor 29 and a time measurement unit (e.g., a counter in the microprocessor 22) that measures a sleep time period $t_{sleep}$. In a typical embodiment, when the sleep time period has expired or when the door sensor 29 senses a door event, the remaining circuitry of the device 12 is powered up.

When the device 12 receives a signal from the reader 16, the device 12 remains to communicate with the reader 16 as long as required. If the device 12 does not receive a signal from the reader 16, the device 12 will only stay active as long as necessary to ensure that no signal is present during a time period referred to as a radio-signal time period or sniff "period" ("$t_{sniff}$").

Upon $t_{sniff}$ being reached, the device 12 is powered down again, except for the time measurement unit and the door sensor 29, which operate to wake the device 12 up again after either a door event has occurred or another sleep time period has expired.

In a typical embodiment, the reader-signal time period is much shorter (e.g., by several orders of magnitude less) than the sleep time period so that the lifetime of the device is prolonged accordingly (e.g., by several orders of magnitude) relative to an "always on" scenario.

The sum of the sleep time period and the reader-signal time period (cycle time") imposes a lower limit on the time that the device 12 and the reader 16 must reach in order to ensure that the reader 16 becomes aware of the presence of the device 12. The related time period will be referred to as the passing time ("$t_{pass}$.")

However, a passing time ("$t_{pass}$") is usually dictated by the particular situation. The passing time may be very long in certain situations (e.g., many hours when the device 12 on a freight container is communicating with the reader 16 on a truck head or chassis carrying the container 10) or very short in other situations (e.g., fractions of a second when the device 12 on the container 10 is passing by the fixed reader 16(C) at high speed). It is typical for all the applications that each of the devices 12 will, during its lifetime, sometimes be in situations with a greater passing time and sometimes be in situations with a lesser passing time.

The sleep time period is therefore usually selected such that the sleep time period is compatible with a shortest conceivable passing time, ("$t_{pass,min}$.") In other words, the relation—

$$t_{sleep} \leq t_{pass,min} - t_{sniff}$$

should be fulfilled according to each operative condition of the device. Sleep time periods are assigned to the device in a dynamic matter depending on the particular situation of the device (e.g., within its life cycle).

Whenever the reader 16 communicates with the device 12, the reader 16 reprograms the sleep time period of the device 12 considering the location and function of the reader 16, data read from the device 12, or other information that is available in the reader 16.

For example, if the container 10 equipped with device 12 is located on a truck by a toplifter, straddle carrier, or other suitable vehicle, the suitable vehicle is equipped with the reader 16, whereas the truck and trailer are not equipped with any readers 16. It is expected that the truck will drive at a relatively-high speed past the fixed reader 16(C) at an exit of a port or a container depot. Therefore, the reader 16(C) on the vehicle needs to program the device 12 with a short sleep time period (e.g., ~0.5 seconds).

Further ramifications of the ideas outlined above could be that, depending on the situation, the reader 16 may program sequences of sleep periods into the device 12. For example, when the container 10 is loaded onboard a ship, it may be sufficient for the device 12 to wake up only once an hour while the ship is on sea. However, once the ship is expected to approach a destination port, a shorter sleep period might be required to ensure that the reader 16 on a crane unloading the container 10 will be able to establish contact with the device 12. The reader 16 on the crane loading the container 10 onboard the ship could program the device 12 as follows: first, wake up once an hour for three days, then wake up every ten seconds.

In another scenario, the reader 16 is moving together with the device 12 and could modify the sleep time period in dependence on the geographical location. For example, it may be assumed that the device 12 on the container 10 and the reader 16 of a truck towing the container 10 may constantly communicate with each other while the container 10 is being towed. As long as the container 10 is far enough away from its destination, the reader 16 could program the device 12 to be asleep for extended intervals (e.g., one hour.) When the reader 16 is equipped with a Global Positioning System (GPS) receiver or other positioning equipment, the reader may determine when the container 10 is approaching its destination. Once the container approaches the destination, the reader 16 could program the device 12 to wake up more frequently (e.g., every second).

While the above-described power-management method has been explained with respect to the device 12 in the context of trucking of freight containers or other cargo in transportation by sea, road, rail or air, it should be understood for those skilled in the art that the above-described power-management method may as well be applied to, for example, trucking of animals, identification of vehicles for road toll collection, and theft protection, as well as stock management and supply chain management.

Figure 2B:
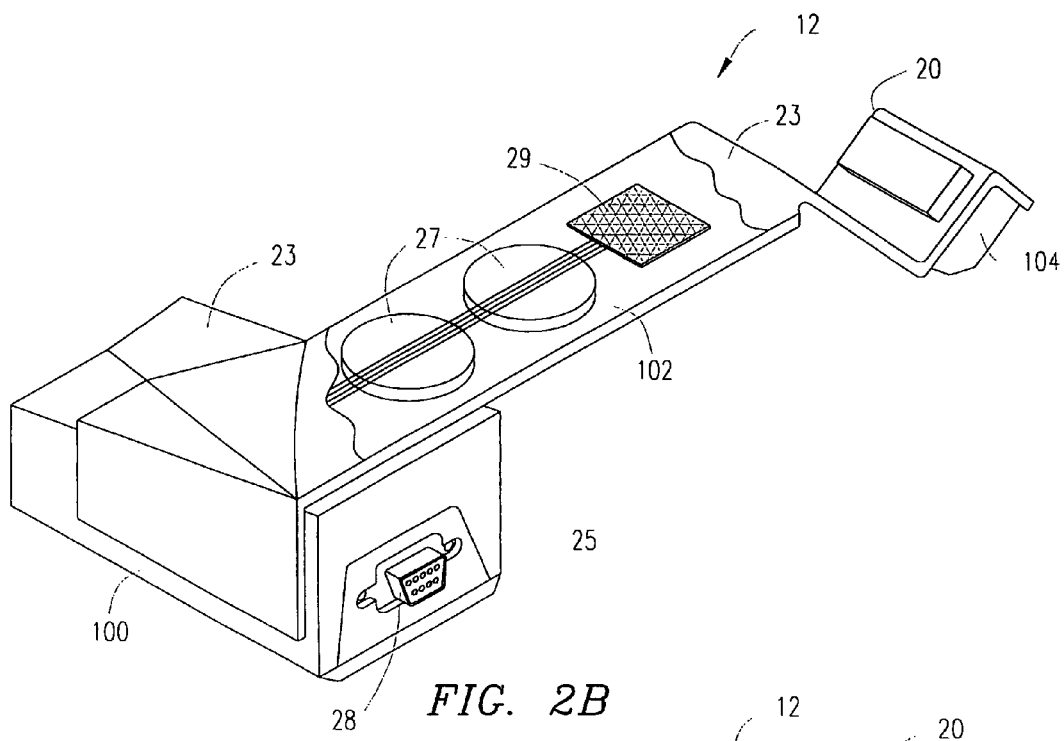
FIG. 2B is a top view of a device according to an embodiment of the present invention.

Referring now to FIG. 2B, there is shown a first perspective view of the device 12. The device 12 includes a housing 25 containing the data unit 100 (not shown), a support arm 102 extending therefrom, and an antenna arm 104 extending outwardly thereof in an angular relationship therewith. As will be described below, the size of the housing 25, the length of the support arm 102, and the configuration of the antenna arm 104 are carefully selected for compatibility with conventional containers. The housing 25, the support arm 102, and the antenna arm 104 are typically molded within a polyurethane material 23 or the like in order to provide protection from the environment.

Still referring to FIG. 2B, a portion of material 23 of the support arm 102 is cut away to illustrate placement of at least one magnet 27 therein and at least one door sensor 29 thereon. The magnet 27 permits an enhanced securement of the device 12 within the container as described below, while the door sensor 29 detects variations in pressure along a sealing gasket (not shown) of the container discussed below.

Figure 2C:
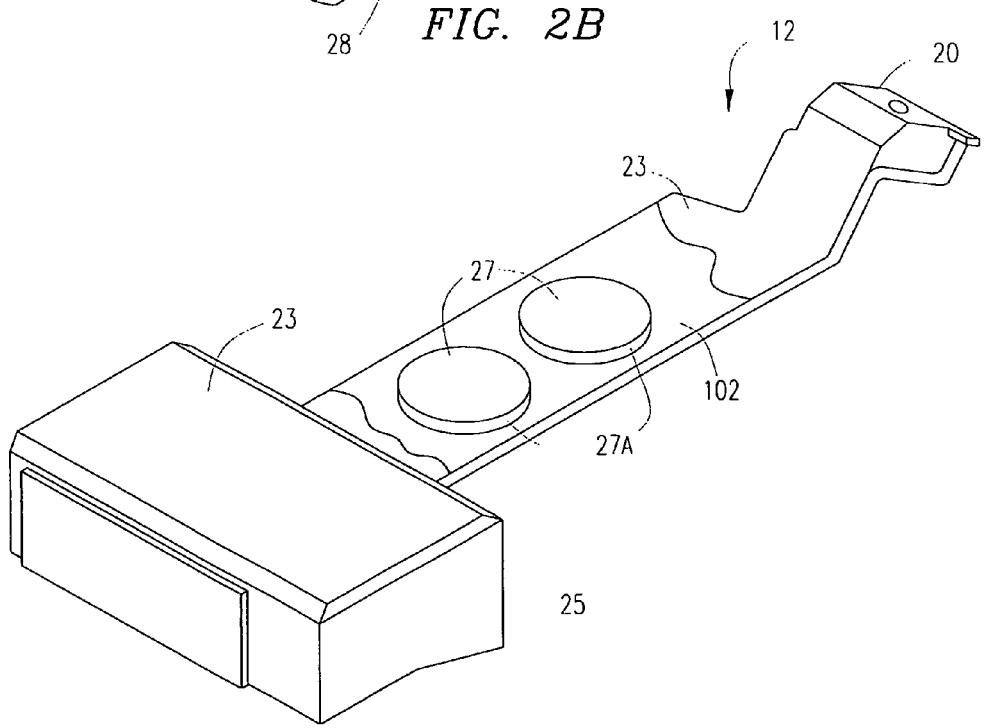
FIG. 2C is a side view of a device according to an embodiment of the present invention.

A second perspective view of the device 12 as illustrated in FIG. 2C, further illustrates the placement of the magnet 27 in the support arm 102. The magnet 27 is positioned within corresponding apertures 27A formed in the support arm 102 and are bonded thereto in a manner facilitating the installation of the device 12.

Figure 2D:
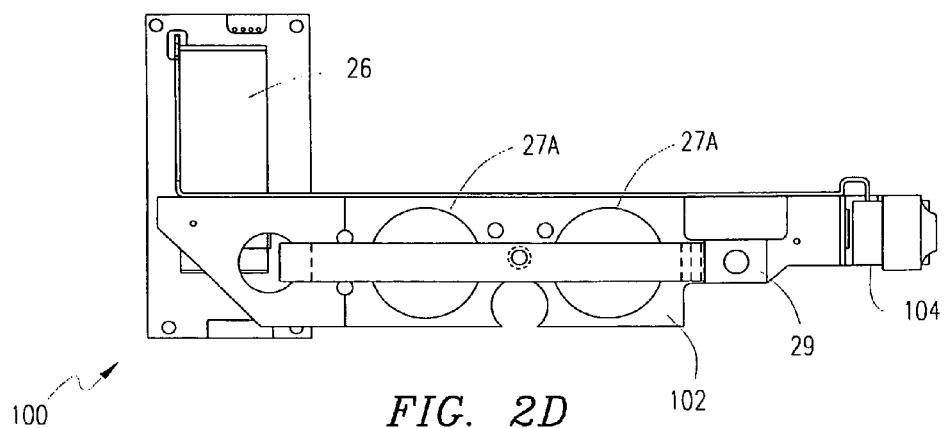
FIG. 2D is a first perspective cut-away view of a device according to an embodiment of the present invention.

Now referring to FIG. 2D, a top view of the device 12 is illustrated before any of the molding material 23 has been applied. In this way, the position of the power source 26, the data unit 100, and the antenna 20 are shown more clearly. The device 12 includes the data unit 100 and power source 26, the microprocessor 22 (not shown), the memory 24 (not shown), and the optional interface 28 (not shown). The support arm 102 extends from the data unit 100 and includes the apertures 27A to house the at least one magnet 27 as well as a support surface to which the door sensor 29 is attached. Extending from the support arm 102 is the antenna arm 104 for supporting the antenna 20.

Figure 2E:
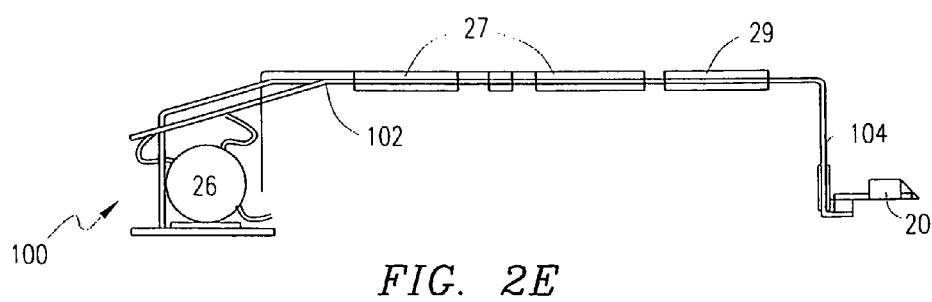
FIG. 2E is a second perspective cut-away view of a device according to an embodiment of the present invention.

Now referring to FIG. 2E, a side view of the device 12 before any of the molding material 23 has been applied is illustrated. As shown, the support arm 102 extends upwardly and outwardly from the data unit 100. The support arm 102 is relatively thin and substantially horizontal, although other configurations are available. As more clearly indicated in FIG. 2E, the antenna arm 104 extends angularly from the support arm 102.

Figure 2F:
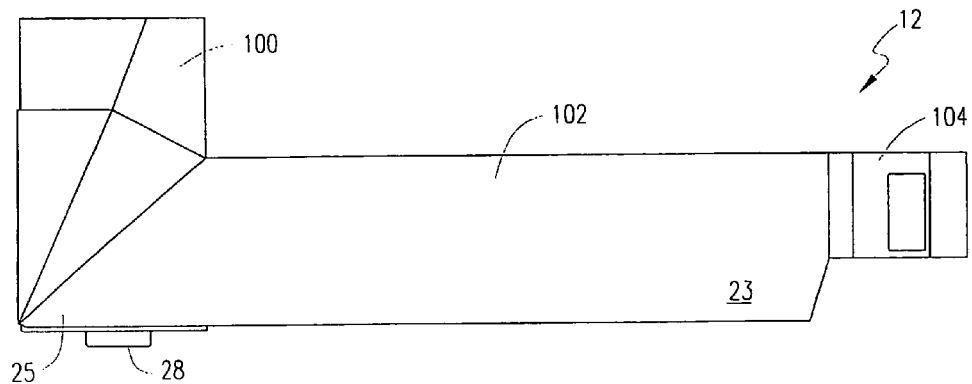
FIG. 2F is a front view of a device according to an embodiment of the present invention.

Referring now to FIG. 2F, there is shown a front view of the device 12 after the molding material 23 has been applied. The device 12 is illustrated with the molded material 23 that forms the housing 25 encapsulating the device 12. The molding material 23 extends from the antenna arm 104 across the support arm 102 and around the data unit 100. The particular shape and configuration shown herein is but one embodiment of the device 12 and no limitation as to the precise shape of the device 12 is suggested herein.

Figure 2G:
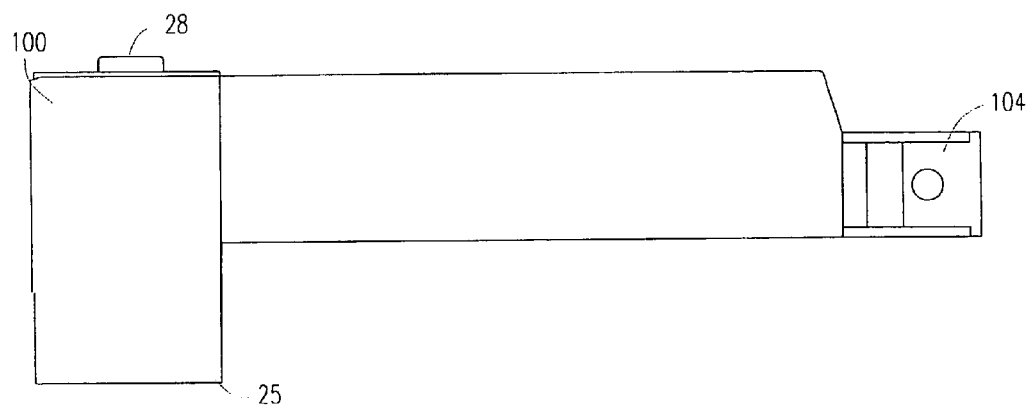
FIG. 2G is a back view of a device according to an embodiment of the present invention.
Figure 2H:
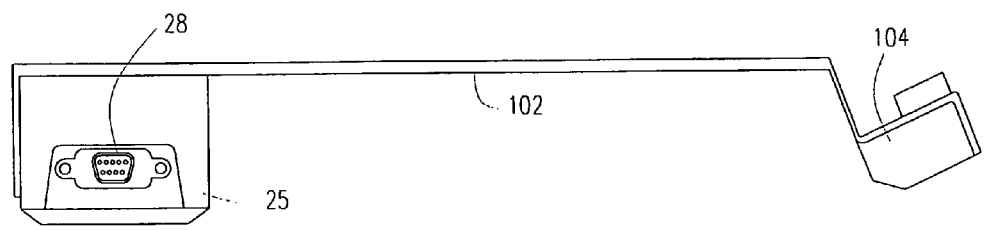
FIG. 2H is a bottom view of a device according to an embodiment of the present invention.
Figure 2I:
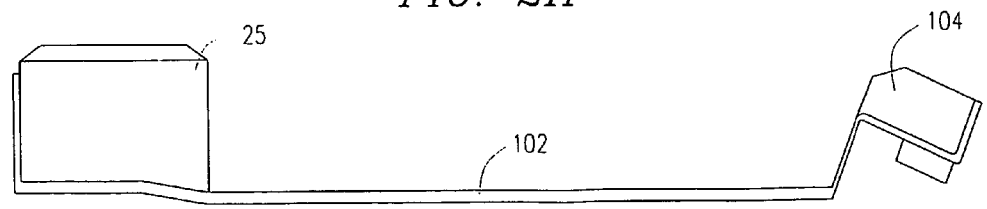
FIG. 2I is a top view of a device according to an embodiment of the present invention.

Referring now to FIG. 2G, there shown a back view of the device 12 according to FIG. 1A. The angular configuration of the antenna arm 104 is likewise seen in a more simplified format for purposes of illustration in FIGS. 2H and 2I, which represent bottom and top views of the device 12.

Figure 2J:
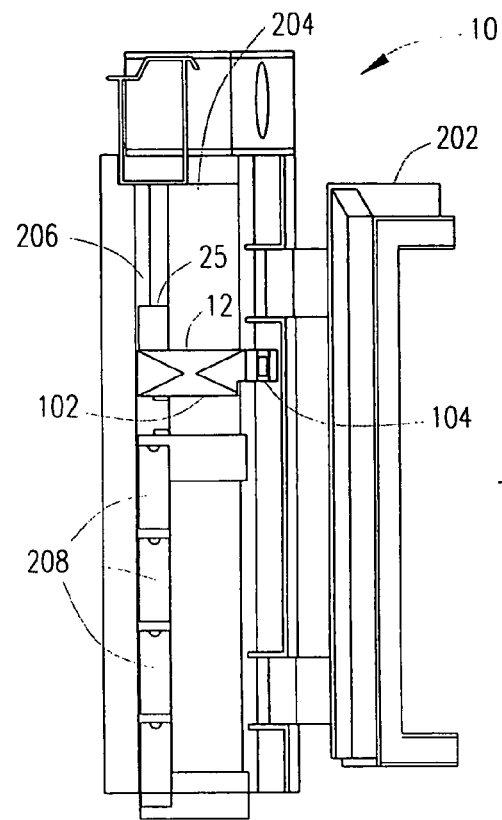
FIG. 2J is a front view of the device of FIG. 2F as installed on a container.

FIG. 2J illustrates a front view of the device 12 as installed on the container 10. The container 10 is shown with a door 202 of the container 10 in an open position to show the orientation of the device 12 in greater detail. The device 12 is mounted to an area adjacent to the door 202 of the container 10. The device 12 may be mounted via a magnetic connection (as previously illustrated), an adhesive connection, or any other suitable connection, on a vertical beam 204 of the container 10. As can be seen in FIG. 2J, the device 12 is mounted so that, when the door 202 is closed, the antenna arm 104 is located on the exterior of the container 10, the door sensor 29, located within the support arm 102, is directly adjacent to a portion of the door 202, and the data unit 100 is located on the interior of the container 10. The device 12 may detect, via the door sensor 29, deviations of pressure to determine whether a door event (e.g., relative and/or absolute pressure change) has occurred. The device 12 may transmit data relative to the status of the door 202 via the antenna 20 to the server 15 as previously described. In addition, the interface 28 may be connected to any number of the external sensors 208 in order to capture information relative to internal conditions of the container 10 and the information obtained via the sensor 208 transmitted to the server 15.

Remaining with FIG. 2J, the device 12 is oriented within the container 10 so that the data unit 100 is disposed within a generally C-shaped recess or channel 206. The support arm 102, including the door sensor 29, extends across the vertical beam 204 between it and a portion of the door 202. When the door 202 is closed, pressure is maintained at the door sensor 29. When the door 202 is opened, the pressure is relieved, thereby alerting the microprocessor 22 that a door event has occurred. An electronic security key stored in the memory 24 will be erased or changed to indicate a "broken" seal or tampering event.

Figure 2K:
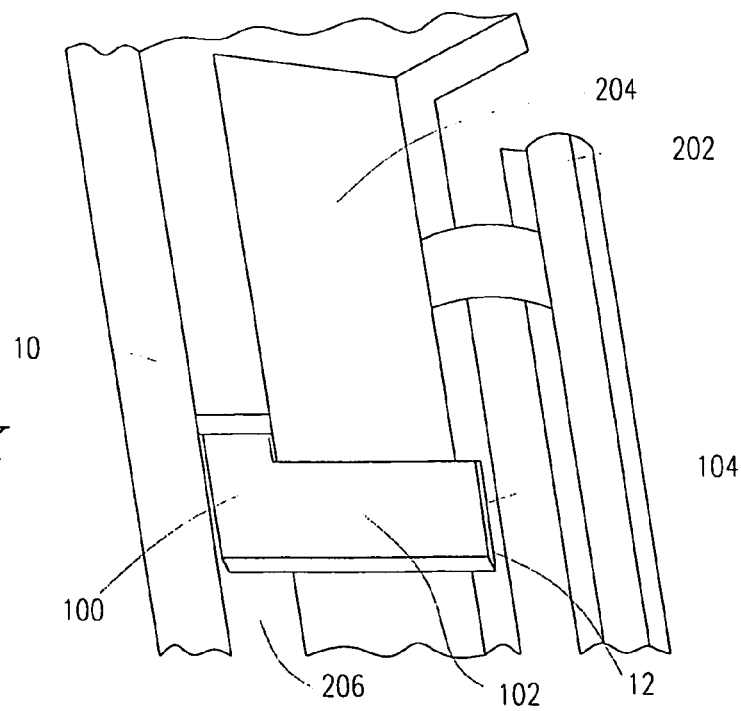
FIG. 2K is a perspective view of the device of FIG. 2F as installed on a container.

FIG. 2K is a perspective view of the device 12 of FIG. 2D as installed on the container 10. The device 12 is shown attached to the vertical beam 204 so that the door sensor 29 (not shown) within the support arm 102 is adjacent to the vertical beam 204, the antenna arm 104 is positioned in an area of the hinge channel of the container 10, and the data unit 100 is positioned inside the C-channel 206 of the container 10. As more clearly shown herein, the antenna arm 104 protrudes from the support arm 102 to an area substantially near the hinge portion of the container 10 in order to remain on the exterior of the container 10 when the door 202 is closed.

By placing the data unit 100 on the interior of the container 10, opportunities for tampering and/or damage to the device 12 are reduced. Because the data unit 100 is disposed in the C-channel 206, even though the contents of the container 10 may shift during transport, the contents are not likely to strike or damage the device 12.

Although the above embodiment is shown as a single unit including at least one sensor and an antenna 20 for communicating with the reader 16, the present invention may be implemented as several units. For example, a light, temperature, radioactivity, etc. sensor may be positioned anywhere inside the container 10. The sensor takes readings and transmits the readings via BLUETOOTH, or any short range communication system, to an antenna unit that relays the readings or other information to the reader 16. The sensors may be remote and separate from the antenna unit. In addition, the above embodiment illustrates a device 12 that includes a door sensor 29 for determining whether a security breach has occurred. However, an unlimited variety of sensors may be employed to determine a security breach in place of, or in addition to, the door sensor 29. For example, a light sensor may sense fluctuations in light inside the container 10. If the light exceeds or falls below a predetermined threshold, then it is determined a security breach has occurred. A temperature sensor, radioactivity sensor, combustible gas sensor, etc. may be utilized in a similar fashion.

The device 12 may also trigger the physical locking of the container 10. For instance, when a reader 16 secures, via a security request, the contents of the container 10 for shipment, the microprocessor 22 may initiate locking of the container 10 by energizing elecromagnetic door locks or other such physical locking mechanism. Once the container is secured via the security request, the container 10 is physically locked to deter theft or tampering.

Figure 3A:
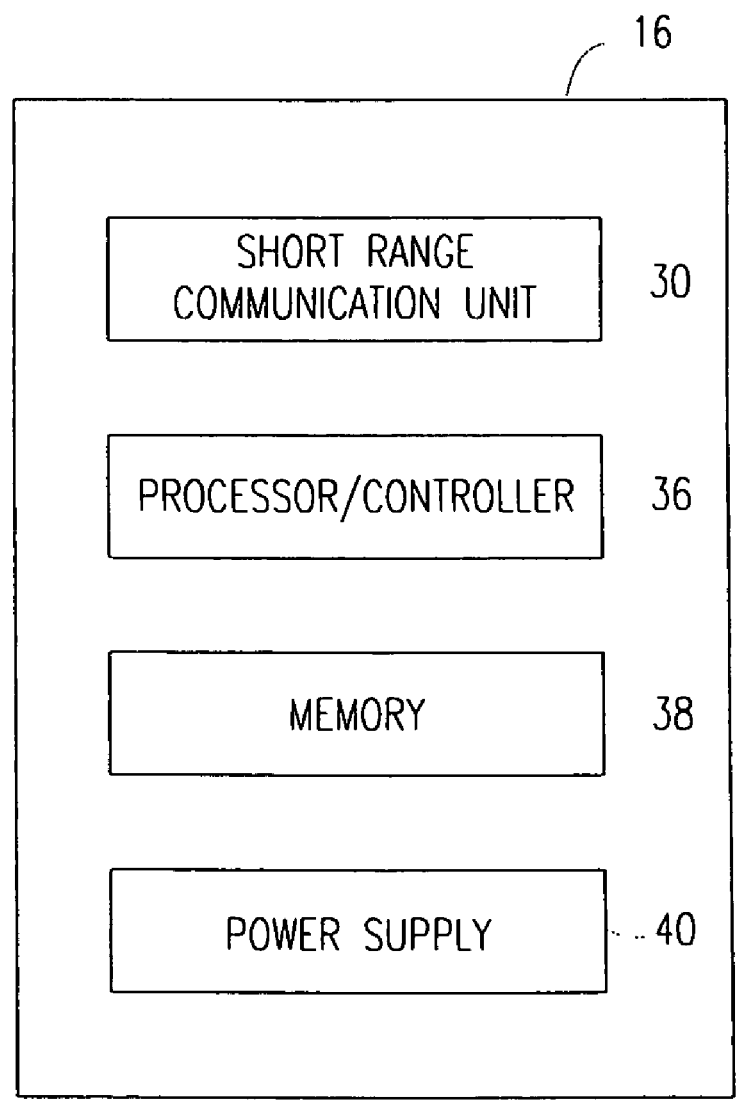
FIG. 3A is a schematic diagram of a reader according to an embodiment of the present invention.

As shown in FIG. 3A, the reader 16 includes a short range antenna 30, a microprocessor 36, a memory 38, and a power supply 40. The short range antenna 30 achieves the wireless short-range, low-power communication link to the device 12 as described above with reference to FIG. 2A. The reader 16 may include or separately attach to a device that achieves a link to a remote container-surveillance system (e.g., according to GSM, CDMA, PDC, or DAMPS wireless communication standard or using a wired LAN or a wireless local area network WLAN, Mobitex, GPRS, UMTS). Those skilled in the art will understand that any such standard is non-binding for the present invention and that additional available wireless communications standards may as well be applied to the long range wireless communications of the reader 16. Examples include satellite data communication standards like Inmarsat, Iridium, Project 21, Odyssey, Globalstar, ECCO, Ellipso, Tritium, Teledesic, Spaceway, Orbcom, Obsidian, ACeS, Thuraya, or Aries in cases where terrestrial mobile communication systems are not available.

The reader 16 may include or attach to a satellite positioning unit 34 is for positioning of a vehicle on which the container 10 is loaded. For example, the reader 16 may be the mobile reader 16(B) attached to a truck, ship, or railway car. The provision of the positioning unit 34 is optional and may be omitted in case tracking and positioning of the container 10 is not necessary. For instance, the location of the fixed reader 16(C) may be known; therefore, the satellite positioning information would not be needed. One approach to positioning could be the use of satellite positioning systems (e.g., GPS, GNSS, or GLONASS). Another approach could be the positioning of the reader 16 utilizing a mobile communication network. Here, some of the positioning techniques are purely mobile communication network based (e.g., EOTD) and others rely on a combination of satellite and mobile communication network based positioning techniques (e.g., Assisted GPS).

The microprocessor 36 and the memory 38 in the reader 16 allow for control of data exchanges between the reader 16 and the device 12 as well as a remote surveillance system as explained above and also for a storage of such exchanged data. Necessary power for the operation of the components of the reader 16 is provided through a power supply 40.

Figure 3B:
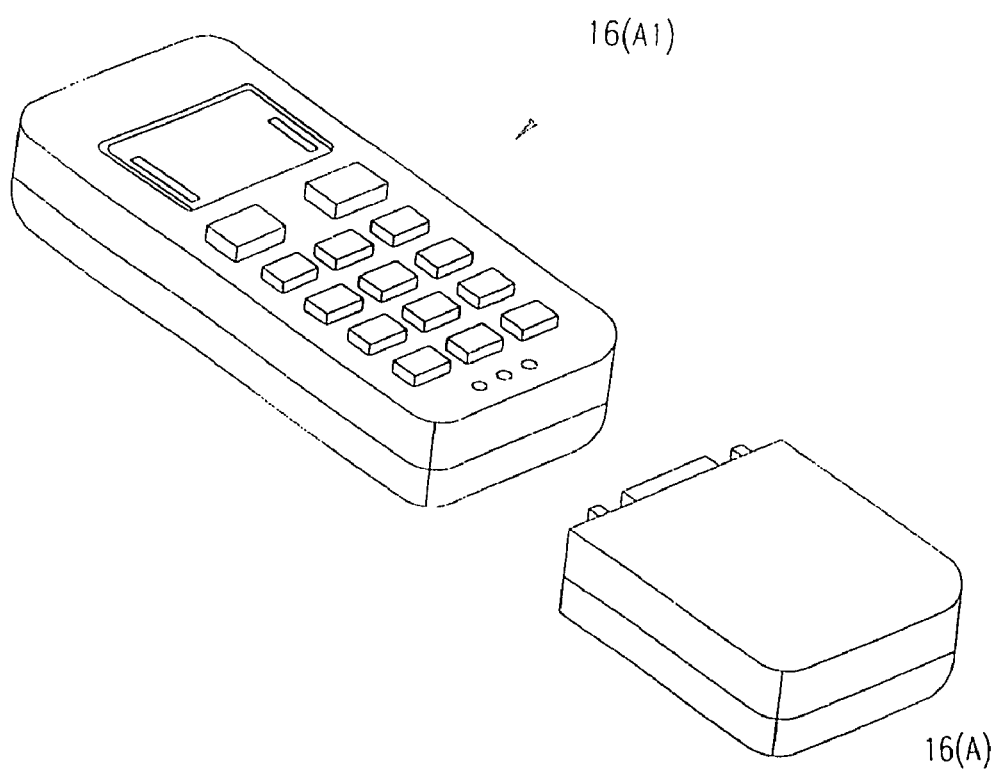
FIG. 3B is a diagram of a reader in accordance with the principles of the present invention.

FIG. 3B is a diagram of a handheld reader 16(A) in accordance with the principles of the present invention. The handheld reader 16(A) is shown detached from a mobile phone 16(A1). The handheld reader 16(A) communicates (as previously mentioned) with the device 12 via, for example, a short-range direct sequence spread spectrum radio interface. Once the handheld reader 16(A) and the device 12 are within close range of one another (e.g., <100 m), the device 12 and the handheld reader 16(A) may communicate with one another. The handheld reader 16(A) may be used to electronically secure or disarm the container via communication with the device 12. The handheld reader 16(A) may also be used to obtain additional information from the device 12 such as, for example, information from additional sensors inside the container 10 or readings from the door sensor 29.

The handheld reader 16(A) shown in FIG. 3B is adapted to be interfaced with a mobile phone shown as 16(A1) or PDA. However, as will be appreciated by those having skill in the art, the handheld reader 16(A) may be a standalone unit or may also be adapted to be interfaced with, for example, a personal digital assistant or a handheld or laptop computer. The reader 16 draws power from the mobile phone and utilizes Bluetooth, or any similar interface, to communicate with the mobile phone.

Additional application scenarios for the application of the device 12 and reader 16 will now be described with respect to FIGS. 4-8. Insofar as the attachment and detachment of the reader 16(B) to different transporting or transported units is referred to, any resolvable attachment is well covered by the present invention (e.g., magnetic fixing, mechanic fixing by screws, rails, hooks, balls, snap-on mountings, further any kind of electrically achievable attachment, e.g., electro magnets, or further reversible chemical fixtures such as adhesive tape, scotch tape, glue, pasted tape).

Figure 4:
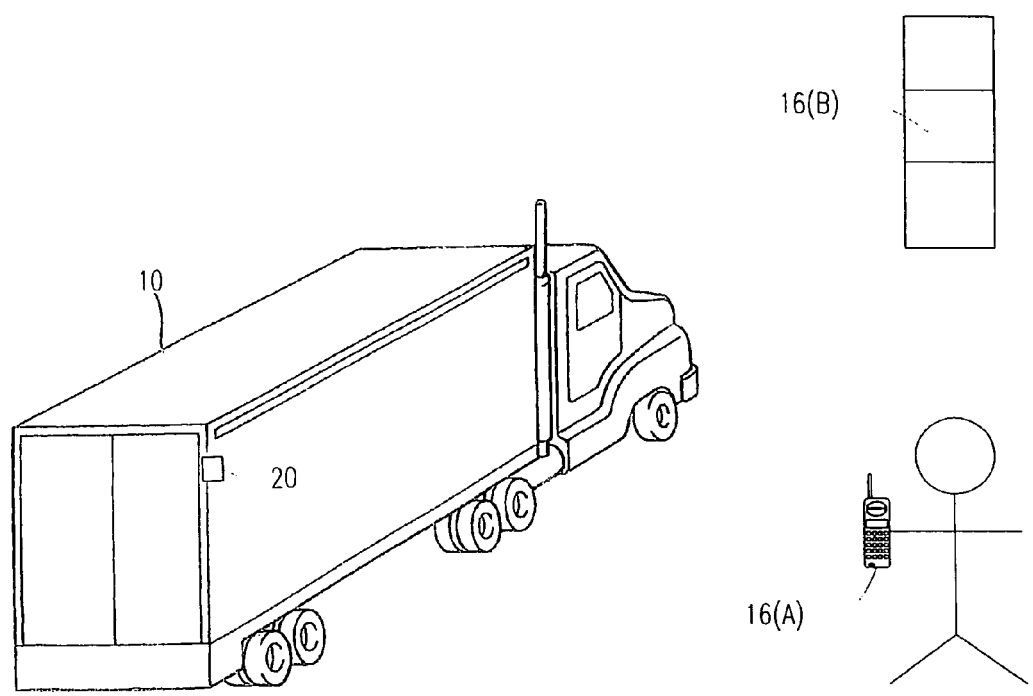
FIG. 4 is a first application scenario of the system of FIG. 1A according to an embodiment of the present invention.

FIG. 4 shows a first application scenario of the device 12 and the reader 16. As shown in FIG. 4 one option related to road transportation is to fix the reader 16 to the gate or a shipping warehouse or anywhere along the supply chain. In such a case, the reader 16 may easily communicate with the device 12 of the container 10 when being towed by the truck when exiting the shipping area. Another option is to provide the reader 16 as a handheld reader 16(A) as described above and then either scan the device 12 as the truck leaves the area or carry the hand-held reader 16(A) within the cabin of the truck during surveillance of the container 10.

Figure 5:
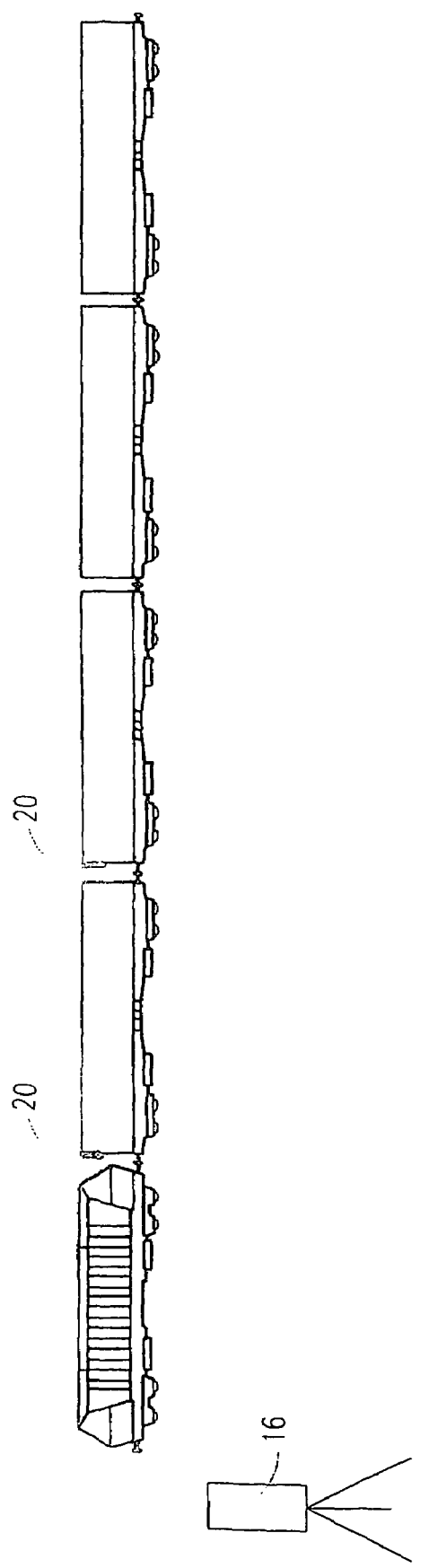
FIG. 5 is a second application scenario of the system of FIG. 1A according to an embodiment of the present invention.

FIG. 5 shows a second application scenario for the device 12 and the reader 16 as related to rail transportation. In particular, FIG. 5 shows a first example where the reader 16 is attachably fixed along the rail line for short-range wireless communication to those containers located in the reach of the reader 16. The reader 16 may then achieve a short range communication with any or all of the devices 12 of the containers 10 that are transported on the rail line.

Figure 6:
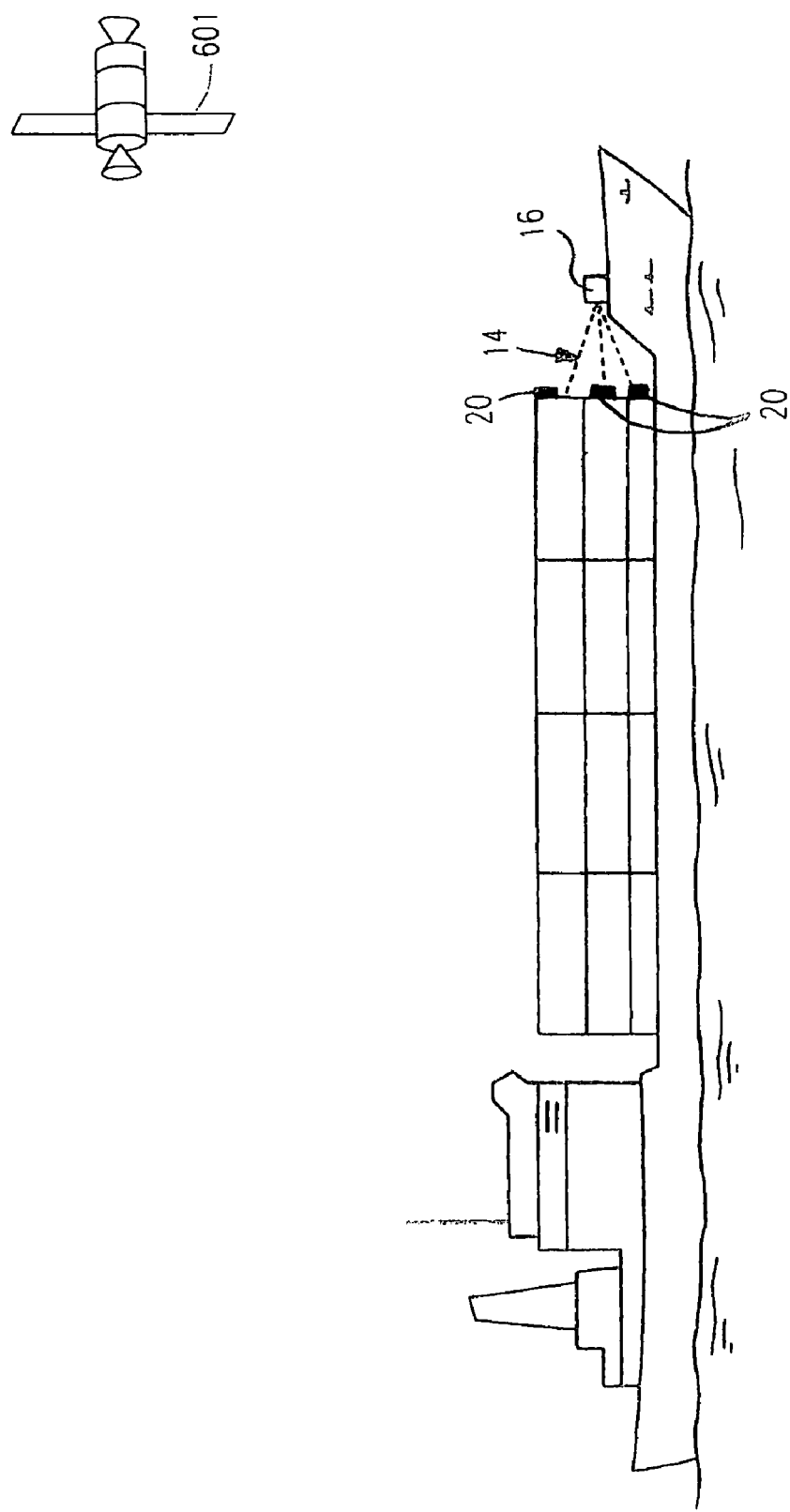
FIG. 6 is a third application scenario of the system of FIG. 1A according to an embodiment of the present invention.

The same principles apply to a third application scenario for the container surveillance components, as shown in FIG. 6. Here, for each container to be identified, tracked, or monitored during sea transport, there must be provided a reader 16 in reach of the device 12 attached to the container 10. A first option would be to modify the loading scheme according to the attachment schemes for the wireless communication units. Alternatively, the distribution of the readers 16 over the container ship could be determined in accordance with a loading scheme being determined according to other constraints and parameters. Again, the flexible attachment/detachment of readers 16 for the surveillance of containers allows to avoid any fixed assets that would not generate revenues for the operator. In other words, once no more surveillance of containers is necessary, the reader 16 may easily be detached from the container ship and either be used on a different container ship or any other transporting device. The reader 16 may also be connected to the AIS, based on VHF communication, or Inmarsat satellites, both often used by shipping vessels.

Figure 7:
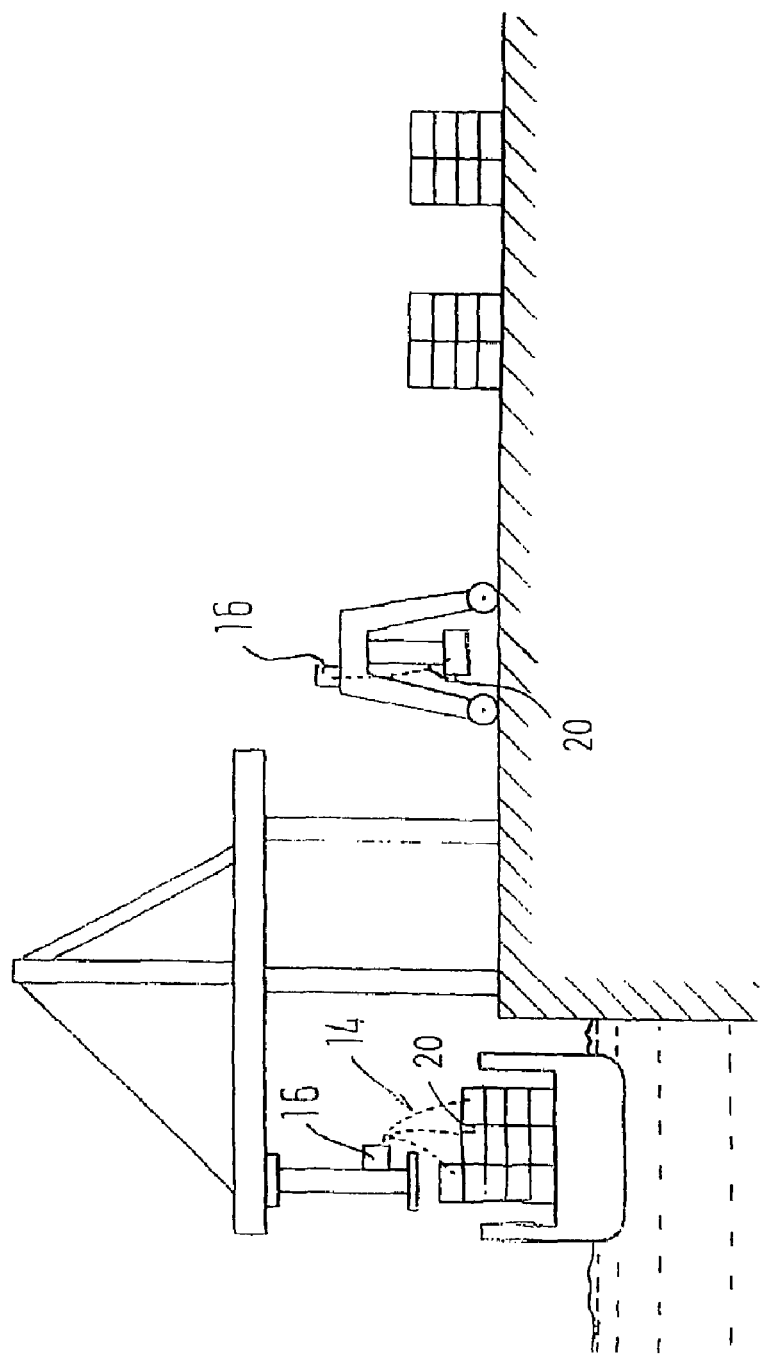
FIG. 7 is a fourth application scenario of the system of FIG. 1A according to an embodiment of the present invention.

While above the application of the inventive surveillance components has been described with respect to long range global, regional or local transportation, in the following the application within a restricted area will be explained with respect to FIG. 7.

In particular, the splitting of the short range and long range wireless communication within a restricted area is applied to all vehicles and devices 12 handling the container 10 within the restricted area such as a container terminal, a container port, or a manufacturing site in any way. The restricted area includes in-gates and out-gates of such terminals and any kind of handling vehicles such as top-loaders, side-loaders, reach stackers, transtainers, hustlers, cranes, straddle carriers, etc.

A specific container is not typically searched for using only a single reader 16; rather, a plurality of readers 16 spread over the terminal and receive status and control information each time a container 10 is handled by, for example, a crane or a stacker. In other words, when a container passes a reader 16, the event is used to update related status and control information.

Figure 8:
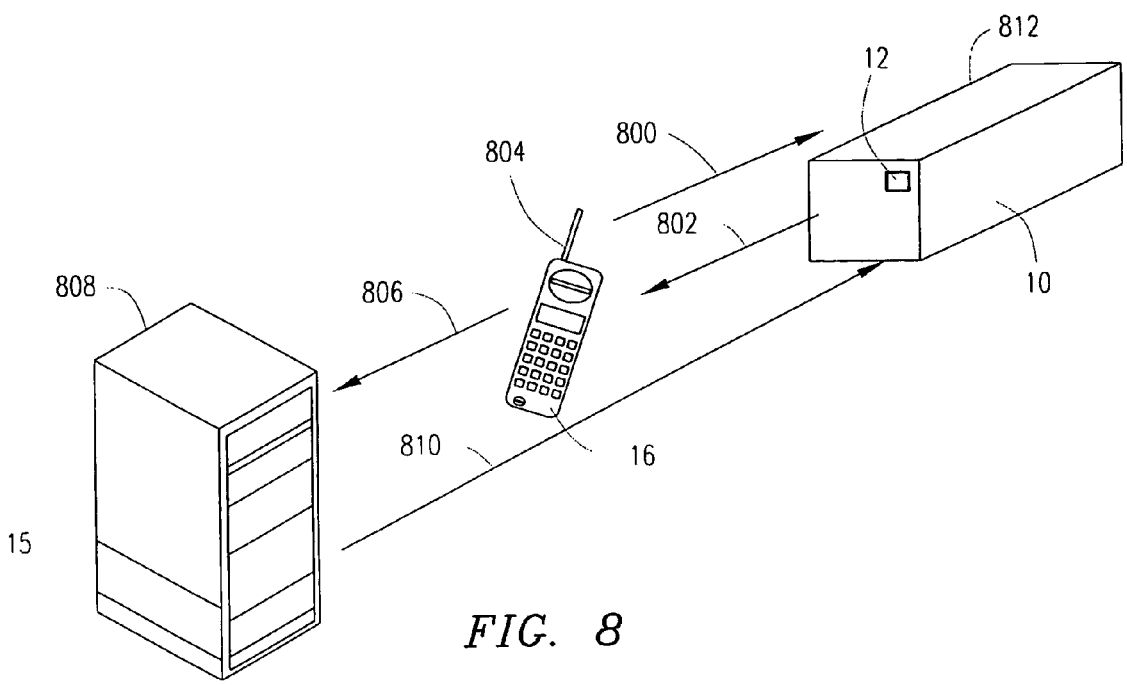
FIG. 8 is a diagram illustrating a container-securing process in accordance with an embodiment of the present invention.

FIG. 8 illustrates a flow diagram of a securing process in accordance with an embodiment of the present invention. First, at step 800, identification is requested from the device 12 by the reader 16. At step 802, the device 12 transmits the identification to the reader 16 and, at step 804, the reader 16 selects a container 10 to secure. A request is sent from the reader 16 to the server 15 at step 806. At step 808, the server 15 generates a security key and encrypts the security key with an encryption code. At step 810, the encrypted security key is transmitted to the device 12 via the reader 16 in order to secure the container 10. At step 812, the security key is decrypted and stored in the device 12. A similar procedure may be initiated to disarm the container 10. The container 10 may be secured automatically when passing in range of a reader 16, or a user may secure or disarm specific chosen containers 10 at a time.

Figure 9:
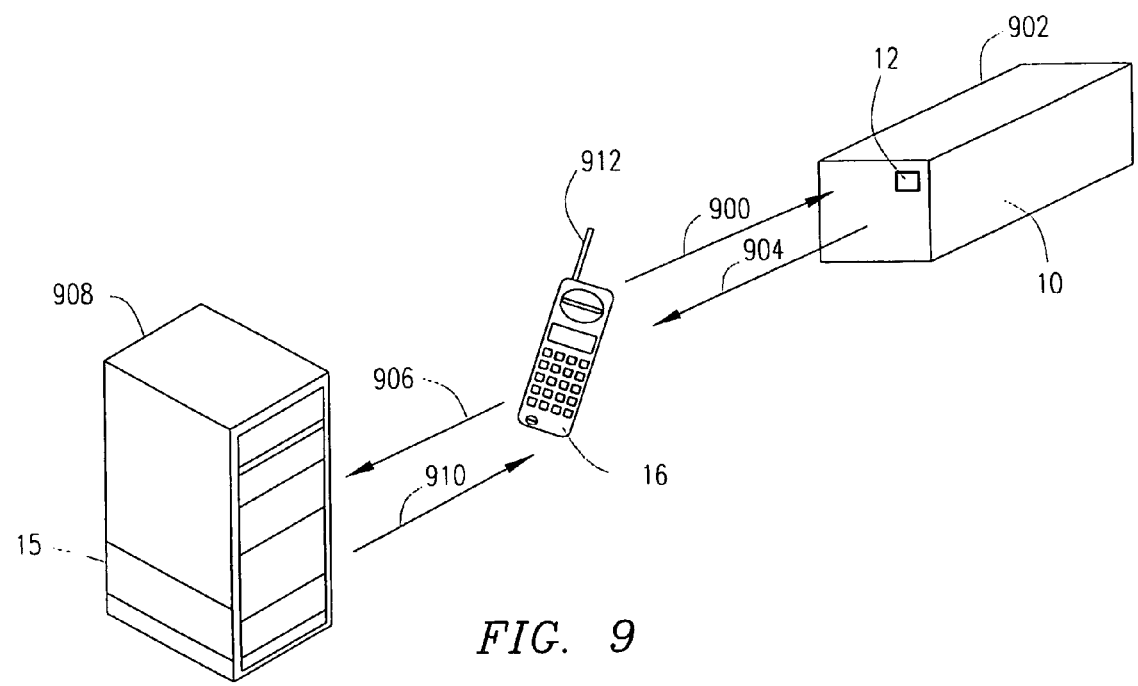
FIG. 9 is a diagram illustrating a container-security-check process in accordance with an embodiment of the present invention.

FIG. 9 illustrates a security-check process in accordance with an embodiment of the present invention. At step 900, the reader 16 transmits a challenge to the container 10 in question. At step 902, the device 12 of the container 10 generates a response using a security key and an encryption code. At step 904, the response is sent from the device 12 to the reader 16. At step 906, the reader 16 also sends a challenge to the server 15. The challenges to the server 15 and the device 12 may be transmitted substantially simultaneously or at alternate points in time. The server 15 generates and sends a response utilizing the security key and an encryption code to the reader 16 at steps 908 and 910 respectively. At step 912, the reader 16 determines if the responses are equal. If the responses are equal, then the container 10 remains safely secured. Alternatively, if the responses are not equal, then a security breach (i.e., door event) of the container 10 has occurred. Similarly to the securing and disarming processes, a security-check may be performed automatically as the container 10 passes in range of a reader 16 or a user may initiate a security-check at any time during transport.

Figure 10:
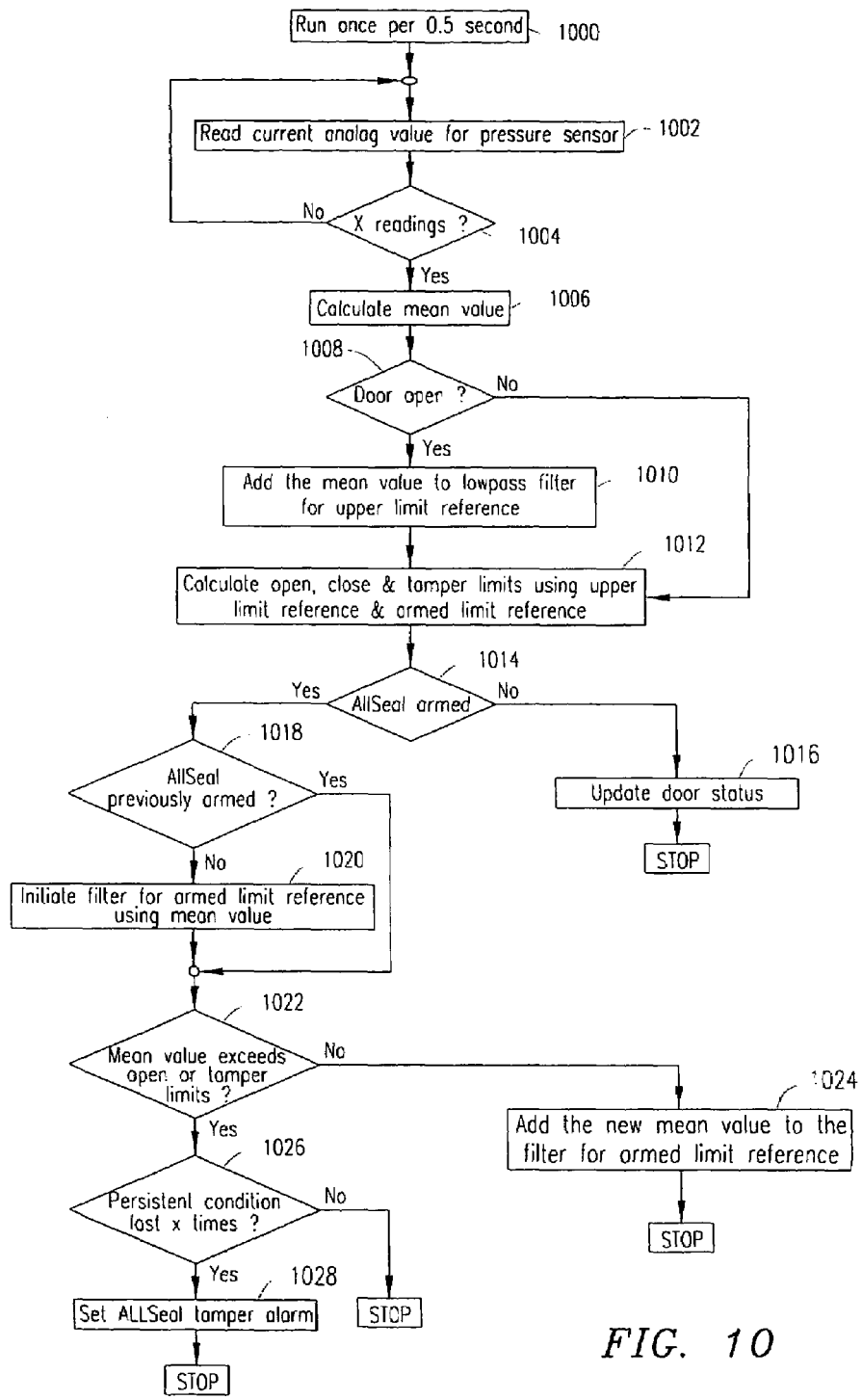
FIG. 10 is a flow diagram illustrating a door-sensor calibration process in accordance with an embodiment of the present invention.

Referring now to FIG. 10, a flow diagram of a calibration and filter process for the door sensor 29 is illustrated. At step 1000, the door sensor 29 is activated to sense a current pressure value every 0.5 seconds, although other time increments may be implemented. The current pressure value is read from the door sensor 29 at step 1002. At step 1004, a number of readings (X), with a time distance of 30 microseconds between each, are accumulated in order to calculate a mean pressure value at step 1006. At step 1008, it is determined whether the door is open. The door is considered open if the mean value is above an open threshold calculated in previous iterations at step 1012 below. If the door is open, then the flow proceeds to step 1010, at which step the mean pressure value is added to a slow low pass filter to get the value for the sensor without any pressure attached (upper limit reference). If it is determined that the door is closed at step 1008, then the flow proceeds to step 1012, at which open, close, and tamper thresholds are calculated using the upper limit reference from step 1010 and the armed limit reference from step 1020 and step 1024 (described below) from previous iterations. The open, close, and tamper thresholds are used to determine if the door is opened or closed at step 1008 and 1022 so that, if either of the open or tamper thresholds is exceeded at step 1022, it is concluded that a security breach has occurred.

At step 1014, it is determined whether the device 12 is currently in an armed state (i.e., whether the container 10 has been secured. If the device 12 is not armed, then the door status is updated at step 1016 using the open and close thresholds from step 1012. If the device 12 is armed, then it is determined at step 1018 whether the device 12 was previously armed. If the device 12 was not previously armed, then at step 1020, an armed limit reference is set to the current mean pressure value from step 1006. At step 1022, it is determined whether the current pressure value exceeds the open or tamper limits. If the mean value from step 1006 does not exceed the open or tamper limits, then at step 1024 the mean value from step 1006 is inserted to the filter for the armed limit reference. If the mean value from step 1006 exceeds the open or tamper limits, then at step 1026 it is determined whether the condition is persistent. If the condition is persistent (i.e., the condition occurs consistently for 2 seconds or more), then at step 1028 the tamper alarm is set to alert the system and/or user that a security breach has occurred.

Although embodiment(s) of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the invention defined by the following claims.

What is claimed is:

1. A system for electrically securing and determining whether a security breach of a container has occurred following electronic securement of the container, the system comprising:

a support arm configured to be disposed between a vertical beam of the container and a hinge portion of a door of the container;

an antenna arm coupled with the support arm and configured to be positioned outside the container;

a sensor configured to be disposed within the container for detecting at least one condition of the container and providing sensor data;

a data unit coupled with the support arm and configured to be disposed within the container and interoperably connected to the sensor, wherein the data unit comprises a microprocessor configured to establish a baseline value from the sensor data, define a sensor data threshold, and determine from the sensor data value threshold and the sensor data whether a security breach has occurred; and a transmitter operably connected to the microprocessor and adapted to transmit, via the antenna arm information relative to whether a security breach has occurred to a location outside the container.

2. The system of claim 1, wherein the sensor is adapted for positioning between the door of the container and the vertical beam of the container for detecting pressure exterted by the door against the sensor.

3. The system of claim 2, wherein the microprocessor is adapted to establish a baseline pressure value from at least one pressure value existing at the time of electronic securement of the container.

4. The system of claim 1, wherein the support arm is further configured position the data unit inside a C-channel of the container.

5. The system of claim 1, wherein:

the at least one detected condition comprises sensed light; and the sensor comprises a light sensor disposed inside the container.

6. The system of claim 1, wherein:

the at least one detected condition comprises sensed motion; and the sensor comprises a motion sensor disposed inside the container.

7. The system of claim 1, wherein the sensor comprises at least one of:

a pressure sensor;
a light sensor;
a radioactivity sensor;
a temperature sensor;
a motion sensor;
a combustible-gas sensor;
an ammonia sensor;
a carbon-dioxide sensor;
a fire sensor;
a smoke sensor;
a noise sensor;
a humidity sensor; and
a digital camera.

* * * * *

UNITED STATES PATENT AND TRADEMARK OFFICE
CERTIFICATE OF CORRECTION

PATENT NO. : 7,564,350 B2  
APPLICATION NO. : 11/198738  
DATED : July 21, 2009  
INVENTOR(S) : Boman et al.

Page 1 of 1

It is certified that error appears in the above-identified patent and that said Letters Patent is hereby corrected as shown below:

In Column 8, Line 54, delete "off" and insert -- off. --, therefor.

In Column 12, Line 23, delete "elecromagnetic" and insert -- electromagnetic --, therefor.

In Column 16, Line 20, in Claim 2, delete "exterted" and insert -- exerted --, therefor.

Signed and Sealed this

Twenty-ninth Day of September, 2009

David J. Kappos
*Director of the United States Patent and Trademark Office*